United States Patent [19]
Gruss

[11] 3,745,309
[45] July 10, 1973

[54] ELECTRICALLY HEATED TRANSPARENT PANEL

[75] Inventor: George A. Gruss, Mentor, Ohio

[73] Assignee: General Electric Company, Schenectady, N.Y.

[22] Filed: Oct. 31, 1972

[21] Appl. No.: 302,501

[52] U.S. Cl. .............. 219/522, 219/203, 219/541, 219/544
[51] Int. Cl. ............................................ H05b 3/06
[58] Field of Search .................... 219/203, 522, 541, 219/544; 29/611

[56] References Cited
UNITED STATES PATENTS

| | | | |
|---|---|---|---|
| 3,383,762 | 5/1968 | Leclercg | 29/611 |
| 3,378,919 | 4/1968 | Brittan | 29/611 |
| 3,409,759 | 11/1968 | Boicey et al. | 219/522 |
| 3,414,713 | 12/1968 | Reifeiss et al. | 219/522 |
| 3,484,584 | 12/1969 | Shaw, Jr. | 219/522 |
| 3,601,583 | 8/1971 | Fujiwara | 219/522 |

FOREIGN PATENTS OR APPLICATIONS

| | | | |
|---|---|---|---|
| 164,435 | 5/1921 | Great Britain | 219/522 |
| 462,641 | 10/1968 | Switzerland | 219/522 |
| 1,288,186 | 2/1962 | France | 219/522 |
| 1,912,667 | 9/1970 | Germany | 219/522 |

Primary Examiner—Volodymyr Y. Mayewsky
Attorney—John F. McDevitt et al.

[57] ABSTRACT

An electrically heated transparent panel is described for a laminated safety glass window construction having a clear polymer inner layer with a pattern of wrinkled resistance wires oriented in a three-dimensional non-parallel random fashion so as to reduce glare from the wires when the window is used in automative and other type vehicles. The individual resistance wires are partially embedded in the polymer sheet by a technique utilizing shrinkage of a thermoplastic polymer from its original dimensions when heated to an elevated temperature together with having the individual wires change configuration when relaxed from tension forces on the wire when first assembled with the polymer sheet. An improved form of bus-bar electrode means are connected at each end of the individual resistance wires by heat-bonding directly to the thermoplastic polymer sheet to provide the composite panel which can thereafter be handled and assembled by conventional further heat-bonding as the inner layer of a laminated safety glass construction.

4 Claims, 3 Drawing Figures

ELECTRICALLY HEATED TRANSPARENT PANEL

BACKGROUND OF THE INVENTION

This invention relates generally to a safety glass window construction which is generally suitable for heating vehicle windows including the windshield, side and rear windows. More particularly, it relates to a glass sandwich having an electrically conducting transparent panel for the inner layer which is substantially free from glare when light is transmitted through the safety glass window. Specifically, it relates to an electrically conducting transparent panel for a safety glass window construction having particular bus-bar electrode means as part of a thermoplastic inner layer along with a protruding array of resistance wires which enables simplified and more reliable assembly of the final window construction along with improved heating of the window.

In a pending U.S. Pat. application entitled, "ELECTRICALLY HEATED WINDOW", Ser. No. 166,064, filed July 26, 1971 in the names of George A. Gruss, George J. Polanka, and Leslie H. Pfeiler, which is assigned to the assignee of the present invention, there is disclosed and claimed a composite sheet member which comprises a layer of transparent thermoplastic polymer that has been heat-shrunk from its original dimensions by heating to an elevated temperature having partially embedded in one major surface a plurality of wrinkled resistance wires which lie in closely spaced relationship and are oriented with respect to one another in non-parallel random fashion so that portions of said individual resistance wires protrude from said major surface of the thermoplastic polymer layer and form a three-dimensional heating wire construction with improved fabrication and operational advantages. As one embodiment of said novel transparent heating panel which forms the otherwise conventional inner layer for a laminated safety glass window construction, there is also described in said earlier filed application certain bus-bar electrode means consisting of a single strip of electrically conducting material secured at each end of the individual resistance wires to form a parallel-connected electrical circuit therebetween. The single strip electrodes are in direct physical contact with protruding portions of the individual resistance wires and provide a generally reliable termination which is not subject to mechanical rupture of the heating wires at the electrical terminations. On the other hand, these single bus-bar strips are secured by heat-bonding directly to one major surface of the thermoplastic polymer sheet with the individual resistance wires being secured to the opposing side of the strips. Such termination can result in occasional failure of direct electrical contact between the strips and the heating wires which is caused by excessive flow of the polymer material when the final window assembly is made. Even without excessive flow of the plastic material, there can be increased contact resistance from chemical reaction between the copper bus-bars and the plastic material after the final assembly has been put into use.

In said earlier filed application referenced above, there are also disclosed methods and apparatus for assembling the electrically heated transparent panel as well as the final safety glass window assembly. In one method of fabricating the electrically heated transparent panel, the electrical resistance wire forming the heating wire pattern is prestressed to provide wrinkles when the resistance wire is not under tension. The prestressed wire is thereafter applied under tension to one major surface of the transparent thermoplastic polymer sheet in a pattern having closely spaced parallel orientation with respect to the individual wires whereupon the tension on the individual resistance wires is relaxed while retaining physical contact between the pattern of resistance wires and the surface of the thermoplastic polymer sheet. During the subsequent heating step, the polymer sheet as well as the wires can expand and contract along the direction of the wire path. The composite member is then heated by applying electrical power to the individual resistance wires so that portions of the wires which are in physical contact with the surface of the polymer sheet become embedded and the remaining portions of the individual wires protrude from the major surface of the plastic sheet. The composite member having a bus-bar electrode configuration and the resistance wire pattern as above described can thereafter be assembled as the inner layer of an otherwise conventional safety glass window construction in a variety of already known methods. The final heat-bonding step which produces the glass laminate is also generally carried out under sufficient heating and compressional forces that significant flow of the polymer material occurs.

A particular apparatus to fabricate the composite member is also described in said copending application which utilizes a collapsible drum member upon which the member is formed. In so doing, the thermoplastic polymer sheet is first wrapped upon the drum followed by application of separate heating and bus-bar electrodes, and then followed by winding of prestressed resistance wire in the form of a helical coil over the wound polymer sheet. The composite member is then formed by collapsing the drum a predetermined decrease in diameter and thereafter thermally tacking or heat-bonding the resistance wire and the subjacent single element bus-bar electrodes to the polymer sheet.

The products and methods of the present invention constitute improvements over said earlier disclosure which can utilize the same general apparatus to assemble the electrically heated transparent panel of the present invention. Consequently, a detailed description of the same apparatus need not be repeated in the present specification except to explain the method of carrying out the present invention.

SUMMARY OF THE PRESENT INVENTION

This invention provides a novel technique for incorporating improved bus-bar electrode means in an electrically heated transparent panel of a laminated safety glass construction. The overall construction provides a laminated safety glass member with improved ability to remove ice and snow as well as defrost.

The object of the present invention, therefore, is to provide a superior electrically heated safety glass construction including improved methods to form the electrically heated transparent panel. Still a further object is to provide an electrically heated laminated window construction having improved thermal capacity for defrosting as well as removing ice and snow from a windshield wherein the electrically heated transparent panel enables a simplified and more reliable assembly of the final glass laminate along with improved heating of the window. Still another object of the present invention is to provide simple and reliable means of assembling resistance wires with a thermoplastic polymer sheet so that the composite member can be easily handled thereafter to produce a laminated safety glass member by conventional techniques.

Briefly stated, the improved bus-bar electrode means of the present invention which are connected at each end of the individual resistance wires to provide a parallel-connected electrical circuit therebetween each consists of a thin foil strip of electrically conducting metal having a segmented construction which is secured by heat-bonding directly to the thermoplastic polymer layer and a continuous foil strip of greater width and thickness than said segmented foil strip which overlays the subjacent segmented foil strip and is also heat-bonded directly to the thermoplastic layer. The individual resistance wires are juxtapositioned at each end between the foil strips such that there is direct physical and electrical contact between the continuous foil strip and the subjacent segmented strip. The subjacent segmented foil strips are further heat-bonded to the thermoplastic polymer sheet in the final glass laminate so as to deform and partially envelop the exterior surface portion of the individual resistance wires which improves the electrical path to the overlying principal electrode strips of bus-bars. In this manner of construction, the subjacent segmented strips also serve as a barrier to plastic flow of the polymer sheet material when the final glass laminate is formed by heat-bonding under pressure which otherwise could retard or interrupt the electrical path. Finally, the segmented construction of the subjacent foil elements provide uniform thermal tacking of the resistance wires to the thermoplastic polymer sheet when practicing the present invention as will be explained later in more detail.

DESCRIPTION OF THE PREFERRED EMBODIMENTS

Figure 1:
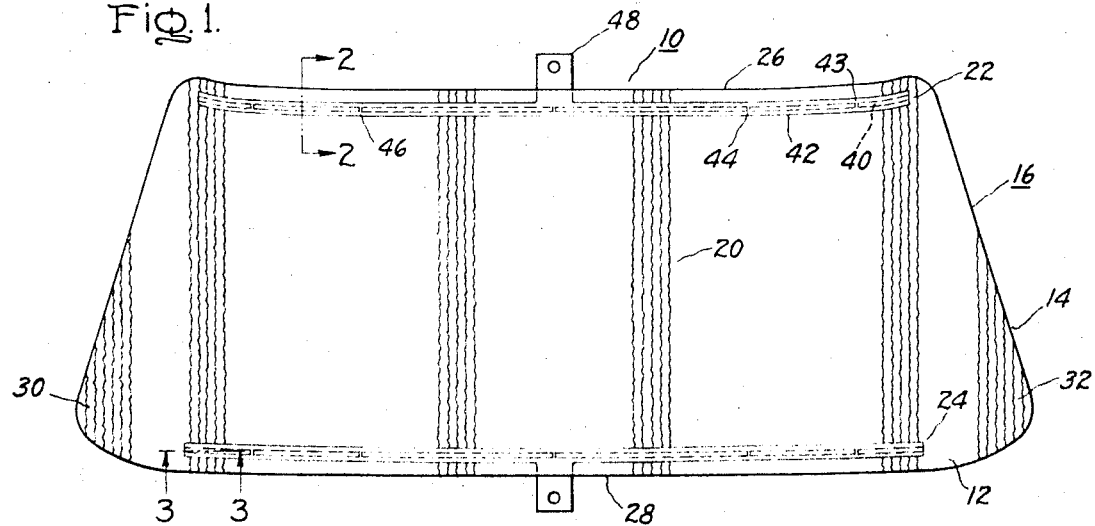
FIG. 1 is a perspective view of a curved window member having a laminated safety glass construction according to the present invention.

The present invention provides simple and effective means to reduce a major difficulty encountered with a parallel arrangement of resistance heating wires in a laminated safety glass window. While the glare phenomena encountered is not fully understood at the present time, it is believed attributable to the wire direction rather than spacing between the individual wires. By randomizing the wire direction in accordance with practice of the present invention, it becomes possible to distribute light reflection or defraction via the individual wires in all directions and thereby reduce or eliminate the glare. While a complete randomization of the individual wires would be most difficult to achieve, it has been found that a controlled randomization having a three-dimensional degree of spatial orientation is sufficient to substantially eliminate the glare problem.

Controlled randomization of the resistance wire pattern is obtained by applying prestressed resistance wires upon one major surface of the sheet of transparent thermoplastic material and thereafter utilizing the ability of the polymer material to shrink from its original dimensions when heated to elevated temperatures sufficient to embed portions of the individual wires in the contacted surface of thermoplastic material. More particularly, a pattern of the prestressed resistance wires is applied under tension to one major surface of the thermoplastic sheet so that individual wires are in closely spaced parallel relationship in the composite member so formed which is then heated under conditions permitting the individual resistance wires to expand and adopt a configuration attributable to the prestressed forces. Subsequent cooling of the composite member allows the wires to become partially embedded in the softened thermoplastic material and provides the final randomization in the wire pattern such that individual wires have a wrinkled or irregular crimp at irregular intervals along their length. A non-parallel relationship between adjacent wires is thereby formed with portions of the wire protruding from the surface of the thermopolymer layer at different elevations where not embedded. The final non-parallel wire pattern will be governed by thermal expansion differences between the polymer sheet and the wire, the nature and extent of prestressed forces applied to the resistance wire before incorporation in the polymer surface, and the heat shrinkage characteristics of the thermoplastic material. It has also been noted during experience with this mode of fabrication that certain polyvinyl butyral polymer sheets which are conventionally employed as the inner layer in laminated safety glass undergo greater shrinkage in one direction along the major surface than in a surface direction perpendicular thereto. By aligning the direction of greater shrinkage with the wire direction, it thereby becomes possible to further enhance randomization of the wire pattern so that a non-parallel configuration exists both in the plane of a major surface of the polymer sheet as well as in planes at angle thereto.

The relatively high heating capacity of the wire pattern obtained in the foregoing manner is due to using fine wire having a diameter from approximately 0.0003 to 0.0009 inches in a spacing from 10 to 30 wires per inch. Since it will be recognized that wattage dissipation which can be obtained by connecting the wire pattern to a source of electrical energy will depend upon contact resistance as well as other factors, it becomes desirable to provide an effective and efficient means of connecting the wire pattern to the electrical power supply. Toward this end and as a principal feature of the present invention, the applicant has discovered novel bus-bar electrode means for connecting the wire pattern at each end of the individual resistance wires as an integral part of the electrically heated transparent panel. Said novel bus-bar electrode means along with its method of construction will now be described in connection with the drawings which accompany this specification.

Turning now to the drawings, FIG. 1 represents a schematic view of an otherwise conventional automobile windshield having a curved contour and which includes the substantially glare-free resistance wire pattern produced in accordance with the present invention. More particularly, a laminated safety glass sandwich 10 is shown which comprises a pair of outer glass layers 12 and 14 which are adhesively held together by heat-bonding to the electrically heated transparent panel of the present invention 16 as an integral construction. Said electrically heated transparent panel serving as the inner layer of the safety glass sandwich (which is shown more clearly in FIG. 2) is a composite member which includes a sheet of transparent thermoplastic polymer 18 having partially embedded in one major surface a plurality of wrinkled resistance wires 20 which are oriented with respect to one another in a three-dimensional and non-parallel random fashion. Bus-bar electrode members 22 and 24 form an integral part of said composite member and are disposed at each end of the individual resistance wires to provide an electrical termination means for heating the wires from the available electric power supply in the vehicle. Both bus-bar members are disposed longitudinally over most of the longitudinal dimension of the window construction and are located both proximate as well as parallel to opposing marginal edges 26 and 28 of the curved safety glass window construction. In the FIG. 1 embodiment the resistance wire pattern 20 is aligned transversely for electrical and physical contact at each end of the individual resistance wires so that sections 30 and 32 of the wire pattern which lie beyond the extreme ends of the longitudinal bus-bar direction are not part of the electrical heating system.

Figure 2:
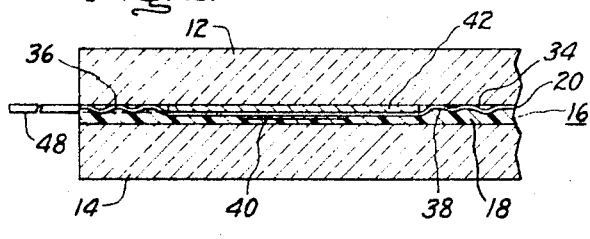
FIG. 2 is a section 2—2 along one longitudinal marginal edge of the window construction shown in FIG. 1.

In FIG. 2, there is shown a vertical section through the windshield construction of FIG. 1 to more clearly illustrate the bus-bar electrode configuration of the present invention. While the degree of three-dimensional resistance wire randomization which exists when the electrically heated transparent panel is constructed according to the invention is somewhat obscured in FIG. 2 by reason of the compression forces applied during assembly of the final safety glass window construction, there can still be seen portions 34 and 36 of an individual resistance wire protruding from major polymer surface 38 of the thermoplastic polymer sheet. Thus, it can be seen that portions of the individual resistance wires which protrude at different elevations from the polymer sheet surface are free to move when compressed by the adjacent glass layers during pressure lamination of the final glass sandwich using the present electrically heated transparent panel. In so doing, the individual resistance wires undergo further random orientation with respect to the plane of said major polymer sheet surface in the final heat-bonding under pressure. In this manner of fabricating the final window assembly it will also be apparent that the thermoplastic polymer is relatively free to move during the final heat-bonding step and could interfere with the proper electrical termination of the individual resistance wires unless means were adapted to prevent such action.

As can be seen in FIG. 2 taken together with reference to FIG. 1, the bus-bar electrode configuration 22 in the final glass laminate consists of a thin foil strip 40 having a segmented construction illustrated by slits 43, 44, and 46 which is secured by heat-bonding to the underlying thermoplastic layer and a continuous foil strip 42 of greater width and thickness which overlies the subjacent segmented strip and is also heat-bonded directly to the thermoplastic layer. The slit openings which extend entirely through the segmented strip 40 provide an interrupted electrically conducting path when the individual resistance wires are thermally tacked to the thermoplastic polymer sheet in a manner to be explained in more detail hereinafter. The continuous foil strip is in direct contact on one side with the inner surface of glass outer layer 12 while being in physical and electrical contact on the other side with both an individual heating wire 20 and the subjacent segmented strip 40. The direct contact between the foil strips which can both be constructed of an electrically conducting metal such as copper is achieved through partial deformation of the underlying segmented strip which occurs both during thermal tacking of the individual resistance wires to the thermoplastic polymer sheet and the final window assembly in a manner also to be further explained. The section in FIG. 2 was also chosen to illustrate a tab feature 48 of the continuous foil strip 42 which permits electrical connection to the vehicle power supply for the window heating system.

Figure 3:
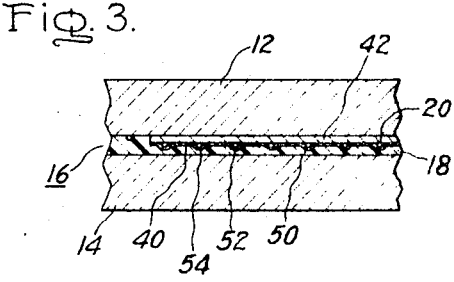
FIG. 3 is a section 3—3 taken through a different marginal edge of the same window construction.

FIG. 3 is a cross sectional view in the opposite direction of the bus-bar electrode means of the present invention. More particularly, a section 3—3 has been taken through laminated glass window member in a direction perpendicular to section 2—2 which is shown in FIG. 2 in order to more clearly depict the final assembled configuration of an individual bus-bar electrode. Thus, a laminated safety glass construction is shown having the glass outer layers 12 and 14 integrally bonded together with the electrically heated transparent panel 16 wherein the individual resistance wires illustrated at 50, 52, and 54 which make up the heating pattern 20 are positioned between the continuous foil strip 42 and the subjacent segmented strip 40. As can be noted, the subjacent segmented strip has been partially deformed to envelop the exterior surface of the individual resistance wires in accordance with a preferred method of fabricating the electrically transparent panel having such bus-bar electrode means as an integral part. It should also be noted in said bus-bar configuration that portions of the segmented strip which do not envelop the individual resistance wires are in direct physical and electrical contact with the overlying continuous strip 42.

A preferred method of fabricating the electrically heated transparent panel having a three-dimensional non-parallel random configuration of resistance wires along with the bus-bar electrode members of the present invention utilizes the general process described and claimed in the aforementioned pending patent application. Hence, the general process which forms no part of the present invention need not again be described in the present specification except in relation to applying the improved bus-bar means to the electrically heated transparent panel. Accordingly, a pair of the segmented foil strips are first applied upon one major surface of the sheet of transparent thermoplastic polymer which shrinks from its original dimensions when heated to an elevated temperature so that each strip is located proximate and parallel to an opposing marginal edge of the contour defining a curved safety glass window member. Thereafter, a transverse pattern of the resistance wires is applied in parallel orientation with respect to one another between said segmented foil strips and so that said wire pattern extends beyond the segmented strip. This step is followed by securing the wire pattern to the same major surface of the polymer sheet using electrical heating electrodes placed at the end of the individual resistance wires according to the known process. Electrical power can then be applied to the heating electrodes so that the polymer sheet and resistance wires can expand and contract during heating to embed portions of the wires in the surface of the polymer sheet also in accordance with the known process. The foil strips are segmented in order to apply electrical power uniformly with the heating electrodes since the curved contour of the window and the conforming wire pattern provide individual resistance wires of unequal length which would otherwise be subject to non-uniform heating. The segmented foil strips undergo slight deformation during this thermal tacking step sufficient for partial contact with the subsequent applied continuous foil strips wires and further provide a barrier layer at the electrical terminations to any flow of thermoplastic polymer material during the final heat-bonding step of the window assembly. The continuous foil strips 42 of sufficient width and thickness to satisfy the electrical current carrying requirements and enable direct bonding to the same major surface of the polymer sheet are next secured by supplemental thermal tacking which can take place after removal of the heating electrodes. The customary final heat-bonding step used in production of the glass laminate provides further deformation of the segmented foil strips wherein said strips envelop the exterior surface portion of the individual resistance wires resulting in direct physical and electrical contact with the overlying continuous foil strips.

The above described method of forming the improved bus-bar electrode means of the present invention can be carried out upon the same apparatus described and claimed in the aforementioned copending application. More particularly, said known apparatus employs a collapsible drum member which cooperates with mechanical means of prestressing the resistance wires to obtain the wrinkled resistance wire configuration. This is accomplished by applying a transverse pattern of the prestressed resistance wire under tension between the segmented foil strips prior to thermal tacking of the resistance wires on the thermoplastic polymer sheet. In the present method of applying the bus-bar electrodes, the collapsible drum member of said known apparatus can be supplied with template means defining the curved window contour. For example, a template pattern for the window of FIG. 1 would be aligned with its longitudinal dimension in the direction of the longitudinal drum axis. Said template means can simply be a scribed outline located on the periphery of the drum surface over which the sheet of the thermoplastic transparent polymer is wrapped. In employing such modified apparatus to fabricate the electrically heated transparent panel, the segmented foil strips are applied on the outer surface of the wrapped polymer sheet so that each strip is located proximate and parallel to an opposing marginal edge of the curved glass window member at the locations fixed by the template means. A helical coil of the resistance wire is next wound about the drum periphery which is then secured to the outer surface of the polymer sheet and with the heating electrodes being next located externally of the window area. As a more detailed explanation of carrying out the present method with said known apparatus, the process of forming the electrically heated transparent panel includes the following steps:

a. applying the segmented foil strips upon the outer surface of the thermoplastic polymer sheet so that each strip is located proximate and parallel to an opposing marginal edge of the curved safety glass window member, b. prestressing the resistance wire to provide wrinkles therein when the resistance wire is not under tension, c. applying a transverse pattern of the prestressed wire under tension between the segmented foil strip so that the wire pattern extends beyond the strips and securing the wire pattern to the collapsible drum periphery with heating electrodes located externally of the window area, d. relaxing tension upon the resistance wires while retaining physical contact between the pattern of resistance wires and the surface of thermoplastic polymer so that the polymer sheet can contract along the direction of the wire path, e. supplying electrical power to the heating electrodes sufficient to embed those portions of the wire in physical contact with the surface of the polymer sheet, and f. securing the continuous foil strips by heat-bonding to the same major surface of the polymer sheet for direct contact with the individual resistance wires and the subjacent segmented foil strips.

It will be noted in the above method that the foil strips are aligned along the longitudinal marginal edges of the curved safety glass member and as earlier stated, the continuous foil strips can be applied by a supplemental thermal tacking step after the electrically transparent panel has been removed from the drum periphery by heating means other than the heating electrodes. After securing the continuous foil strips to complete the bus-bar electrode means of the present invention, the heating panel can thereafter be easily handled to produce a laminated safety glass member in the conventional manner.

Specific operation of the known apparatus to form such electrically heated transparent panel would include the following essential steps:

a. wrapping a sheet of transparent thermoplastic polymer around the circumference of the collapsible drum and fixing both ends of the sheet to the drum, b. applying a pair of segmented foil strips to the outer surface of the polymer sheet at locations proximate and parallel to opposing marginal edges of the curved safety glass window contour, c. winding a helical coil of prestressed resistance wires in closely spaced relationship upon the drum periphery in contact with the outer surface of the secured polymer sheet and maintaining tension upon each turn of the resistance wires, d. securing the wire coil to the outer surface of the polymer sheet with heating electrodes located between the segmented foil strips and not in the area of the window member, e. collapsing the drum by predetermined decrease in diameter, f. supplying electrical power to the heating electrodes sufficient to embed portions of the wire in the surface of the polymer sheet, and g. applying the continuous foil strips for direct contact with the individual resistance wires and the subjacent segmented foil strips to provide the final bus-bar electrode.

It can be appreciated in the foregoing method that reduction of the drum circumference permits the composite member to sag under gravitational forces from the drum surface which relaxes the tension forces on the resistance wire thereby enabling it to crimp or wrinkle along its length while still maintaining point contact with the polymer sheet. When electrical energy is supplied by means of the heating electrodes to the wire pattern while in this sagged configuration, the polymer material is heated to its softening point, thereby permitting portions of the wire still in physical contact with the polymer surface to become embedded therein. Under these heating conditions, both polymer sheet and wire pattern are permitted to expand and contract along the direction of the wire pattern depending upon the individual thermal expansion characteristics while still remaining in physical contact. It has also been noted during this heating operation that the polymer sheet contracts visibly while still being heated after first undergoing thermal expansion perpendicular to the direction of the wire path. When heating is discontinued by interrupting the electrical energy being supplied to the wire pattern after the shrinkage has taken place and the composite member then allowed to cool, there is produced an adhesive bond at the embedded portions of the wire pattern. By further reason of alignment between the wire path and the shrinkage direction of the polymer sheet, it can be seen that a greater randomization in the final wire pattern as provided than otherwise would occur.

It can be appreciated in the foregoing description of preferred embodiments that other methods could be employed to provide an improved bus-bar electrode configuration with comparable results. Likewise, it is also contemplated to employ the methods herein disclosed in providing the same type bus-bar configuration for different heating wire patterns in a safety glass window member. As one example, the bus-bar electrodes could be oriented in a transverse direction of the window member with the heating wire pattern extending in the longitudinal direction. Additionally, the present bus-bar configuration could be employed with a non-random parallel array of the heating wire to provide certain of the same benefits discovered by the applicant. It is intended to limit the present invention, therefore, only the scope of the following claims.

What I claim as new and desire to secure by Letters Patent of the United States is:

1. In a laminated safety glass member which comprises a pair of glass outer layers having a composite inner layer integrally bonded thereto, said composite inner layer comprising a sheet of transparent thermoplastic polymer which has been heat shrunk from its original dimensions by heating to an elevated temperature having partially embedded in one major surface a plurality of wrinkled resistance wires which lie in closely spaced relationship and are oriented with respect to one another in non-parallel random fashion so that portions of said individual resistance wires protrude from said major surface of the thermoplastic polymer layer, and bus-bar electrode means connected at each end of the individual resistance wires, the improvement wherein said bus-bar electrode means consist of a thin foil strip having a segmented construction which is secured by heat-bonding directly to the thermoplastic polymer layer at each end of the individual resistance wires with a continuous foil strip of greater width and thickness which overlays the subjacent segmented strip and is also heat-bonded directly to the thermoplastic polymer layer at each end of said individual resistance wires.

2. A laminated safety glass member as in claim 1 wherein the continuous foil strip is in direct contact with the inner surface of one glass outerlayer and the individual resistance wires are positioned between said continuous foil strip and the subjacent segmented strip.

3. A laminated safety glass member as in claim 1 wherein the continuous foil strip is in direct physical contact with both resistance wires and the subjacent segmented strip.

4. A laminated safety glass member as in claim 1 wherein the continuous foil strip is in direct contact with the inner surface of one glass outerlayer, the individual resistance wires are positioned between said continuous foil strip and the subjacent segmented strip which has been partially deformed by heat-bonding to envelop the exterior surface portion of said individual resistance wires, and the opposite major surface of the thermoplastic polymer layer is heat-bonded to the inner surface of the other glass outerlayer.

* * * * *